(12) United States Patent
Kang et al.

(10) Patent No.: US 8,105,158 B2
(45) Date of Patent: Jan. 31, 2012

(54) GAME SERVICE METHOD FOR PROVIDING ONLINE GAME USING UCC AND GAME SERVER THEREFOR

(75) Inventors: Sung-hwan Kang, Seoul (KR); Sung-wouk Kang, Seoul (KR); Na-yeon Gong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 12/338,030

(22) Filed: Dec. 18, 2008

(65) Prior Publication Data

US 2009/0170609 A1     Jul. 2, 2009

(30) Foreign Application Priority Data

Dec. 28, 2007   (KR) ................. 10-2007-0140558

(51) Int. Cl.
*G06F 19/00*          (2011.01)
(52) U.S. Cl. ................. 463/30; 463/35; 463/42; 463/43
(58) Field of Classification Search ............... 463/30, 463/35, 42, 43
See application file for complete search history.

(56) References Cited

U.S. PATENT DOCUMENTS

| | | | |
|---|---|---|---|
| 6,433,267 B2 * | 8/2002 | Park et al. .................. 84/611 |
| 2008/0234049 A1 * | 9/2008 | LeBlanc et al. .............. 463/42 |
| 2008/0243333 A1 * | 10/2008 | Uchiyama et al. .......... 701/36 |
| 2008/0281709 A1 * | 11/2008 | Choi et al. ................. 705/14 |
| 2009/0038468 A1 * | 2/2009 | Brennan .................... 84/609 |
| 2009/0144361 A1 * | 6/2009 | Nobakht et al. ........... 709/203 |
| 2009/0221367 A1 * | 9/2009 | Longley et al. ............. 463/32 |
| 2011/0207513 A1 * | 8/2011 | Cross et al. ................. 463/7 |

* cited by examiner

*Primary Examiner* — Evan Pert
(74) *Attorney, Agent, or Firm* — Sughrue Mion, PLLC (57) ABSTRACT

Provided are a game service method, where UCC can be used in an online music game that uses music as an element, and a game server therefor. The game service method includes receiving user created contents (UCC) data in which accompaniment music data and a song sung by a music user are combined, generating note background music (BGM) data in which action note data corresponding to the accompaniment music data and the UCC data are combined, and providing an online music game using the generated note BGM data to a game user.

17 Claims, 6 Drawing Sheets

GAME SERVICE METHOD FOR PROVIDING ONLINE GAME USING UCC AND GAME SERVER THEREFOR

CROSS-REFERENCE TO RELATED PATENT APPLICATION

This application claims the benefit of Korean Patent Application No. 10-2007-0140558, filed on Dec. 28, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to providing a game service, and more particularly, to servicing an online game by connecting the online game to a user created contents (hereinafter, referred to as UCC).

2. Description of the Related Art

Conventionally, a method of servicing UCC connected with an online game does not exist.

Figure 1:
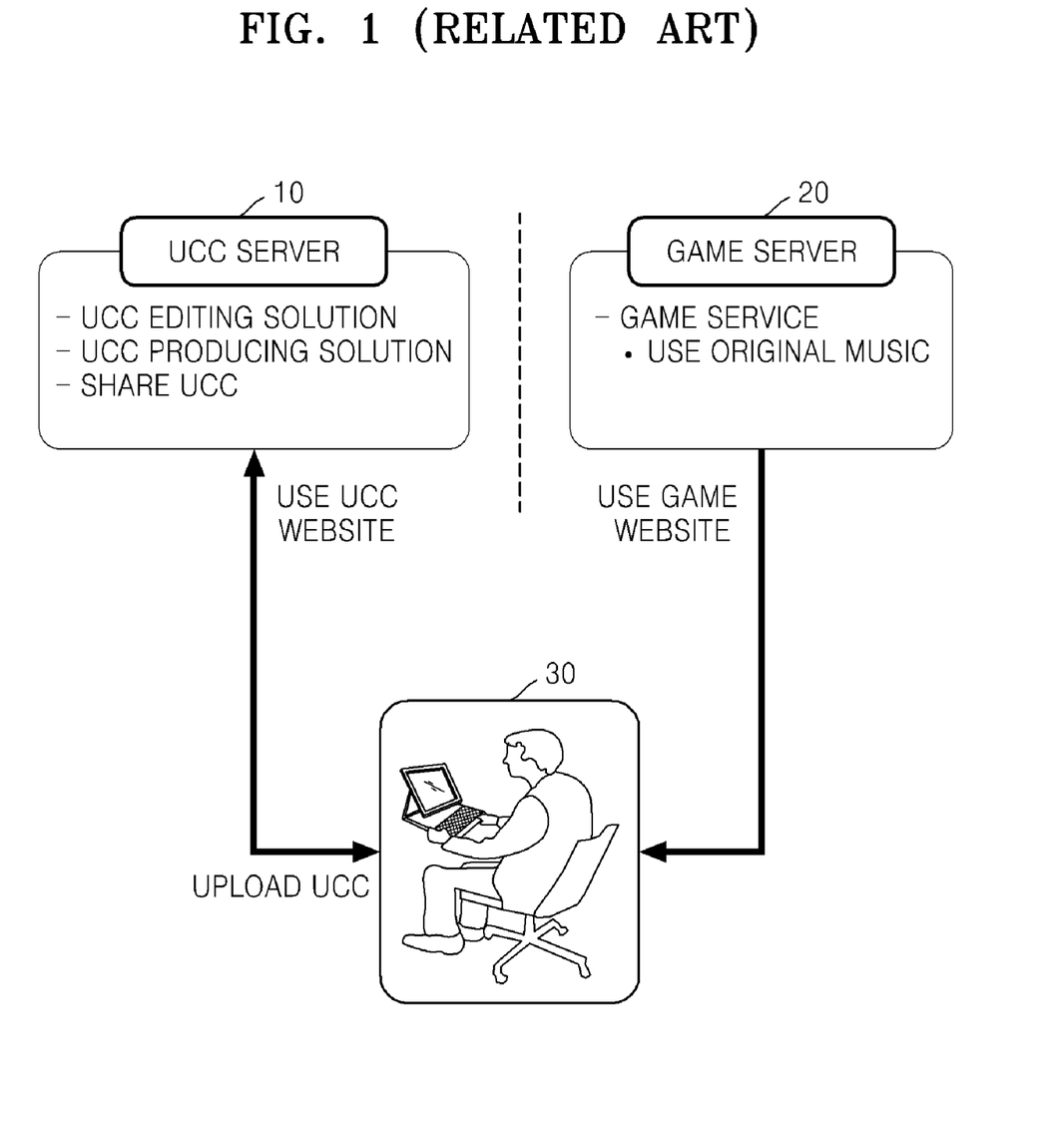
FIG. 1 is a diagram illustrating a UCC server and a game server.

FIG. 1 is a diagram illustrating a conventional UCC service providing apparatus 10 (hereinafter, referred to as a UCC server 10) and an online music game providing apparatus 20 (hereinafter, referred to as a game server 20).

Referring to FIG. 1, the UCC server 10, which is managed by a website providing a UCC service, provides a UCC editing solution, a UCC producing solution, or the like. A user 30 can edit or produce UCC or share self-produced UCC with other users by using a UCC website.

The game server 20 managed by an online music game website provides the user 30 with a game that uses music.

In the game that uses music, music is included as an element of the game, and progress of the game changes according to the music.

For example, a game similar to Dance Dance Revolution (DDR) or Pump is performed online. In other words, an action of the user 30 is pre-determined according to dynamics or tones of music provided as background music (BGM), and the user 30 obtains a score based on how well such action is performed in time.

In a conventional online music game, the original music produced by a professional music producer should be used as BGM. Accordingly, problems related to copyright arise and an expensive royalty for contents should be paid.

Also as illustrated in FIG. 1, there is no connection between the UCC server 10 and the game server 20, and thus the user 30 can use the music only provided from the game server 20 while playing a music game.

SUMMARY OF THE INVENTION

The present invention provides a game service method, which uses UCC that is self-produced by a user in an online music game using music as an element, and a game server therefor.

The present invention also provides a computer readable recording medium having recorded thereon a program for executing the game service method.

According to an aspect of the present invention, there is provided a game service method, including: receiving user created contents (UCC) data in which accompaniment music data and a song sung by a music user are combined; generating note background music (note BGM) data in which action note data corresponding to the accompaniment music data and the UCC data are combined; and providing an online music game using the generated note BGM data to a game user.

The receiving of the UCC data may include: providing the accompaniment music data to the music user; receiving the UCC data from the music user; and checking validity about whether the UCC data can be used in the online music game.

The receiving of the UCC data may include receiving the UCC data from a karaoke service providing apparatus (hereinafter, referred to as a karaoke server), which provides the accompaniment music data to the music user and receives the UCC data from the music user.

The action note data may include information about predetermined action that should be performed by the game user at predetermined time while the UCC data is reproduced.

The predetermined action that should be performed by the game user may be performed by operating a predetermined part of an action inputting apparatus for the game user to play the online music game.

The action inputting apparatus may include a keyboard, a joystick, a controller, an extended joystick, or a simplified keyboard.

The providing of the online music game using the note BGM data to the game user may include: reproducing UCC data included in the note BGM data; and checking whether the game user performs the predetermined action that should be performed at the predetermined time while the UCC data is reproduced.

The game service method further includes: charging a fee for using the note BGM data on the game user; and returning the entire or partial fee to the music user as a payback.

According to another aspect of the present invention, there is provided a game server for providing a game using UCC, the game server including: a UCC receiver, which receives UCC data in which accompaniment music data and a song sung by a music user are combined; a note BGM generator, which generates note BGM data in which action note data corresponding to the accompaniment music data and the UCC data are combined; and a game provider, which provides a game using the generated note BGM data to a game user.

The game server further includes: an accompaniment music data provider, which provides the accompaniment music data to the music user; and a UCC validity checker, which checks validity about whether the UCC data can be used in the game, wherein the UCC receiver receives the UCC data directly from the music user.

The UCC receiver may receive the UCC data from a karaoke server, which provides the accompaniment music data to the music user and receives the UCC data from the music user.

The game provider may include: a UCC reproducer, which reproduces UCC data included in the note BGM data; and a user action checker, which checks whether the game user performs the predetermined action that should be performed at the predetermined time while the UCC data is reproduced.

The game server further includes a fee administrator, which charges a fee for using the note BGM data on the game user, and returns the entire or partial fee to the music user as a payback.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 2:
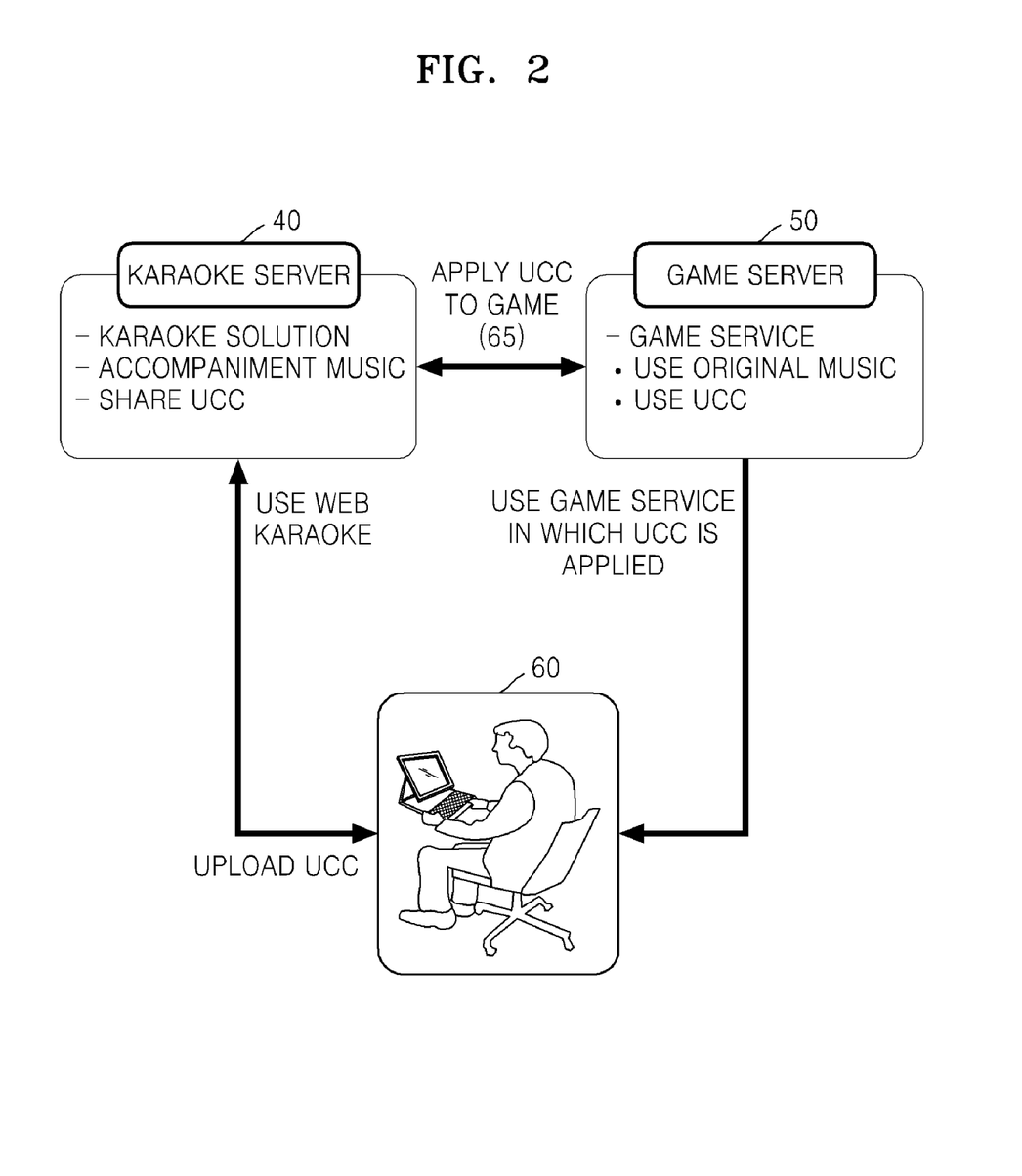
FIG. 2 is a diagram illustrating how a game is provided according to an embodiment of the present invention.

FIG. 2 is a diagram illustrating how a game is provided according to an embodiment of the present invention. Referring to FIG. 2, unlike the conventional UCC server 10 and game server 20, a karaoke server 40 of a karaoke website and an online music game server 50 of an online game website are connected, and thus UCC can be applied to a game as denoted by reference numeral 65. In an exemplary embodiment, the karaoke server 40 and the game server 50 can be provided through one web site.

The karaoke server 40 illustrated in FIG. 2 includes all functions of the UCC server 10 illustrated in FIG. 1. The karaoke server 40 provides various karaoke solutions, by providing accompaniment music data to a user 60 and receiving UCC data from the user 60.

The user 60 is classified into a music user who uses the karaoke server 40 and a game user who uses the game server 50 depending on which service the user 60 is using. The user 60 can simultaneously be the music user and the game user.

The game server 50 according to the current embodiment of the present invention can use the original music like the conventional game server 20, or self-produced UCC.

A game user can play a music game by using UCC produced by another music user or the self-produced UCC.

In order to apply UCC in a game according to the present invention, a song sung by a user and actions that should be performed by the user in the game should be connected. Data about a relationship between UCC data used as BGM and action that should be performed by the user while playing the game is called action note data.

As described above, in a game using the present invention, UCC data used as BGM is reproduced, and while UCC data is reproduced, a use is required to perform predetermined actions at predetermined time.

Action note data includes information about predetermined actions that should be performed by a game user at predetermined time while UCC data is being reproduced.

For example, action note data may assign an action of pressing "A" key of a keyboard at 20 seconds after music started. A game displays a signal requesting to press the "A" key on a screen when the time becomes 20 seconds. At this time, when a game user presses the "A" key, the game user scores a point.

Such action note data may be in various formats according to a game producer, and further include various types of information. For example, the action note data may include a file name and reproduction length of UCC data corresponding to the action note data. Also, it is possible to define an often used symbol as a macro in front of the action note data and use the often used symbol in the other part of the action note data.

Action note data is also called "a note" in short. This is because there is a similarity between action note data of a game and a note on a musical score. A note on a musical score requests a player of a certain musical instrument (for example, a piano) to perform certain action (pressing a keyboard) in order to generate a sound corresponding to the length and height of the note.

Music data includes accompaniment music and voice of a person. Here, the action note data according to the present invention needs to be pre-matched to the accompaniment music because UCC produced by a music user is a combination of accompaniment music data provided by the karaoke server 40 and a recording of a song sung by the music user. In other words, a song is different according to a music user, but the accompaniment music data is the same despite of a music user.

Accordingly, the game server 50 may generate action note data corresponding to accompaniment music data before the karaoke server 40 provides the accompaniment music data to the user 60. In other words, the connection between the karaoke server 40 and the game server 50 shown by the reference numeral 65 in FIG. 2 can be pre-established before the user 60 uses the karaoke server 40.

Figure 3:
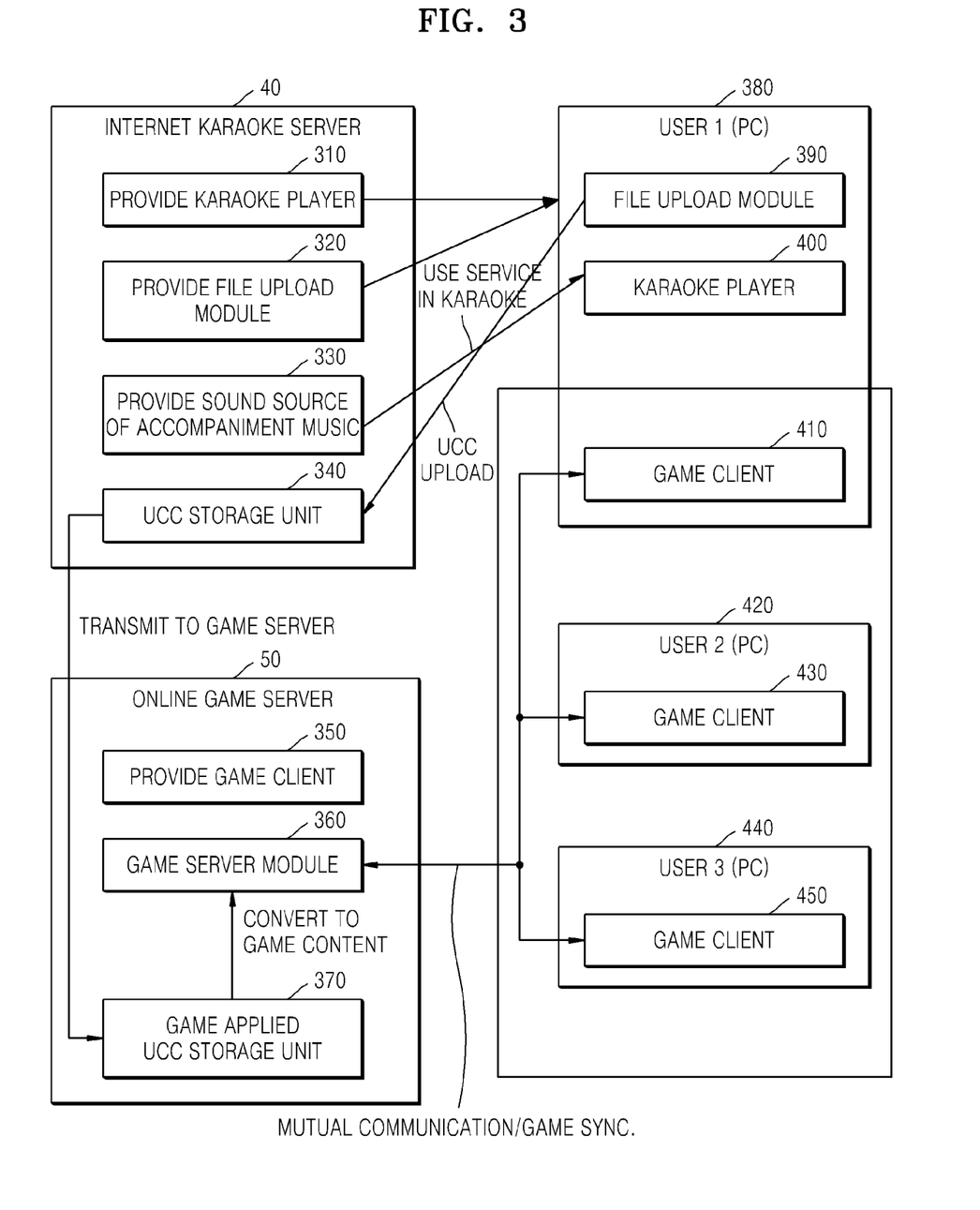
FIG. 3 is a diagram illustrating in detail an environment in which the present invention is performed.

FIG. 3 is a diagram illustrating in detail an environment in which the present invention is performed.

An Internet karaoke server 40 provides a karaoke player 400 to a music user (for example, user 1 380) in operation 310. Also, a file upload module 390 is provided to the music user 380 in operation 320. The file upload module 390 is a program for uploading UCC data produced by the music user 380 to the karaoke server 40.

When the music user 380 requests a karaoke service by assigning certain music, the karaoke server 40 provides a sound source of corresponding accompaniment music to the music user 380 in operation 330. Accompaniment music data is transmitted to the karaoke player 400, and the karaoke player 400 reproduces the accompaniment music data. When the music user 380 sings according to the accompaniment music, the sung song and the accompaniment music are recorded together, and thus UCC data is generated. The file upload module 390 uploads the generated UCC data to the karaoke server 40 in operation 340.

The generated UCC data is stored in a UCC storage unit of the UCC server 40, and then transmitted to an online game server 50. Although not illustrated in FIG. 3, the karaoke server 40 may check validity of the UCC data by determining whether the UCC data can be used in a game.

In the present invention a validity check is a process of checking whether UCC data has an adequate length to be used in a game. For example, when a user only sings the first verse of provided music, a generated UCC has validity of a one verse length. Alternatively, when music is formed of four verses, a user can produce UCC having different validity, such as a one verse length, a two verse length, a three verse length, and a whole length. Alternatively, validity may be checked based on an interlude, whether UCC is with or without an interlude.

However, when the user stops the music even before finishing the first verse, the generated UCC cannot be used in the game. At this time, the UCC is checked for validity, and as the UCC is not valid, it is not transmitted to the game server 50.

The game server 50 may separately perform the validity check.

In an embodiment where the karaoke server 40 and the game server 50 are combined, the validity check can be performed only once.

Hereinafter, it is assumed that only valid UCC is transmitted to the game server 50.

The UCC data transmitted from the karaoke server 40 is stored in a game applied UCC storage unit 370 of the game server 50. The game applied UCC storage unit 370 searches for action note data corresponding to the received UCC, combines the action note data and the UCC data so as to generate note background music (BGM) data.

The note BGM data includes accompaniment music data, music data of a user, and action note data of the corresponding music.

The note BGM data is transmitted to a game server module 360.

The game server 50 provides game clients 410, 430, and 450 to game users 380, 420, and 440 in operation 350. The game clients 410, 430, and 450 are respectively programs for enabling the game users 380, 420, and 440 to play a computer game.

The game server module 360 transmits the note BGM data to the game clients 410, 430, and 450. The game users 380, 420, and 440 play a game while reproducing the UCC data included in the note BGM data.

Figure 4:
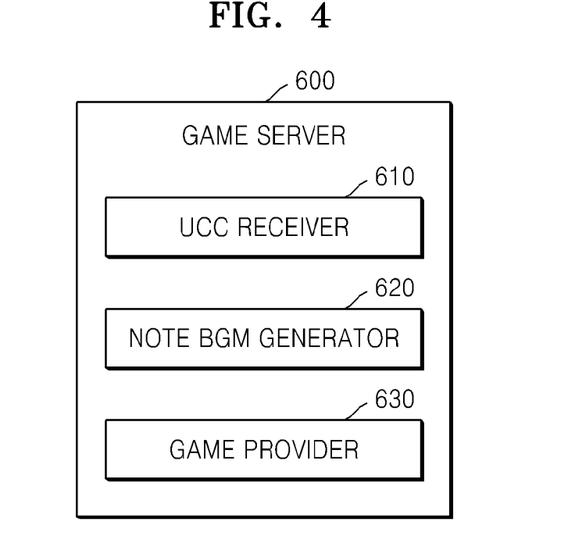
FIG. 4 is a block diagram illustrating a game server according to an embodiment of the present invention.

FIG. 4 is a block diagram illustrating a game server 600 according to an embodiment of the present invention. Referring to FIG. 4, the game server 600 includes a UCC receiver 610, a note BGM generator 620, and a game provider 630.

The UCC receiver 610 receives UCC data from a karaoke server.

The note BGM generator 620 generates note BGM data by combining action note data and the UCC data. As described above, the action note data corresponds to accompaniment music data included in the UCC data. The note BGM generator 620 corresponds to the game applied UCC storage unit 370 illustrated in FIG. 3.

The game provider 630 provides an online music game using the generated note BGM data to a game user. The game provider 630 corresponds to the game server module 360 and the game clients 410, 430, and 450 illustrated in FIG. 3. The game provider 630 may include a UCC reproducer (not shown), which reproduces the UCC data included in the note BGM data, and a user action checker (not shown), which checks whether the game user performs a predetermined action that should be performed at a predetermined time according to information included in the action note data while the UCC data is being reproduced.

Figure 5:
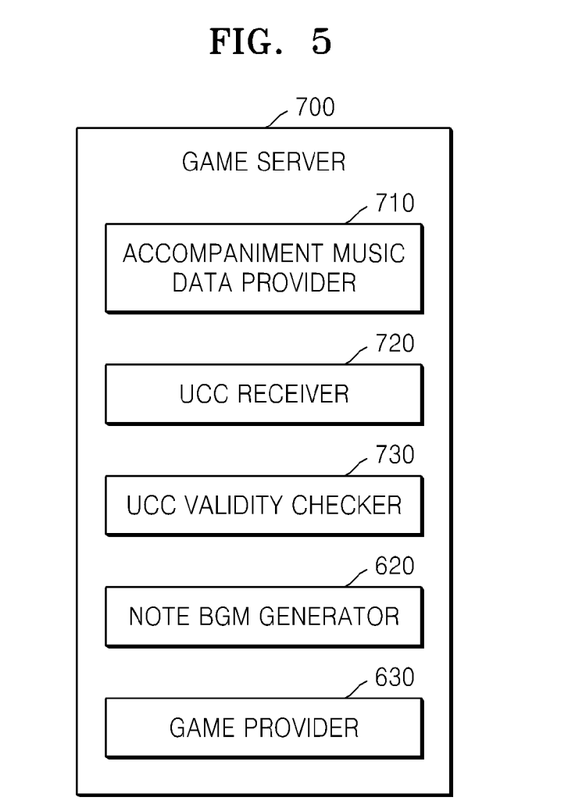
FIG. 5 is a block diagram illustrating a game server according to another embodiment of the present invention.

FIG. 5 is a block diagram illustrating a game server 700 according to another embodiment of the present invention. According to the game server 700 of FIG. 5, a game server and a karaoke server are combined to one device. The game server 700 according to the current embodiment of the present invention includes an accompaniment music data provider 710, a UCC receiver 720, a UCC validity checker 730, a note BGM generator 620, and a game provider 630.

The note BGM generator 620 and the game provider 630 of FIG. 5 are equal to those of FIG. 4, and thus detailed descriptions are omitted herein.

The accompaniment music data provider 710 provides accompaniment music data to a music user.

The UCC receiver 720 receives UCC data from the music user. This is different from the UCC receiver 610 of FIG. 4 receiving the UCC data from the karaoke server.

The UCC validity checker 730 checks validity of the received UCC data. As described above, the validity of the UCC data means determining whether the UCC data can be used in a game.

Figure 6:
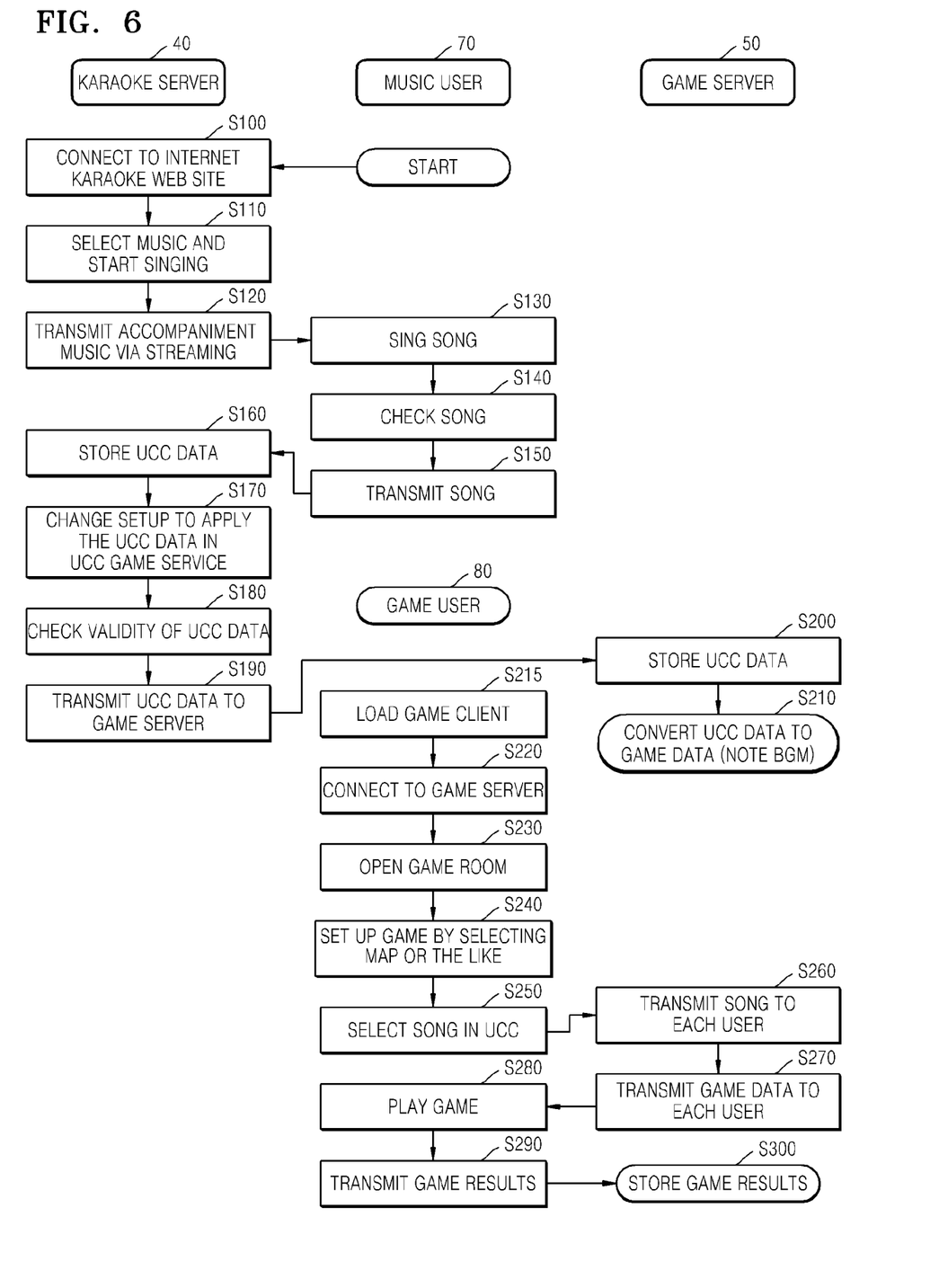
FIG. 6 is a flowchart illustrating a game service method according to an embodiment of the present invention.

FIG. 6 is a flowchart illustrating a game service method according to an embodiment of the present invention.

First, a music user 70 connects to a karaoke server 40 in operation S100, and selects music and a menu for starting the music in operation S110. The karaoke server 40 transmits accompaniment music to the music user in operation S120. The accompaniment music may be transmitted via streaming as illustrated in FIG. 6, but a method of transmitting the accompaniment music is not limited thereto, and entire music files may be simultaneously transmitted to the music user 70.

In operation S130, the music user 70 sings along the accompaniment music. The music user 70 can check the song in operation S140. The song and the accompaniment data are combined to generate UCC data, and the generated UCC data is transmitted to the karaoke server 40 in operation S150. The karaoke server 40 stores the UCC data in operation S160.

The music user 70 connects to the karaoke server 40 so as to manage the UCC data. When the music user 70 wishes to use the UCC data in an online music game, the music user 70 may change setup to apply the UCC data in UCC game service in operation S170.

Before transmitting the UCC data to a game server 50, validity of the UCC data is checked in operation S180. When the UCC data is valid, the karaoke server 40 transmits the UCC data to the game server in operation S190.

In operation S200, the game server stores the UCC data.

When the karaoke server 40 and the game server 50 are included in one device, operations S100 through S180 are performed in the game server 50. In this case, operations S190 and S200 are not performed.

The game server 50 converts the UCC data to game data in operation S210. UCC data conversion is a process of generating note BGM data by combining the UCC data and action note data corresponding to the UCC data. The game server 50 may convert a format of an audio file to a format executable in a game client. For example, the audio file can be formatted to one of MP3, OGG, and WMA. Here, for protecting copyright of a music file, a separate encoding technology may be applied so that only the game client can decode the music file.

A game user 80 loads the game client in operation S215, and connects to the game server 50 in operation S220. As described above, the game user 80 may be the same as or different from the music user 70 who provided the UCC data.

A method of providing a game is different according to the game. In FIG. 6, a plurality of game users connects to one game room and plays a game by using the same UCC. A game user 80 opens a game room in operation S230, and sets up the game by selecting a map or the like in operation S240. When the game user 80 who opened the game room selects UCC that is to be used in the game in operation S250, corresponding UCC data is transmitted to each game user 80 in operation S260. Also, game data (background picture, background screen, information about difficulty of the game, etc.) are transmitted to the game users 80 with the UCC data in operation S270.

The game users play the game in operation S280, and the game results are transmitted to the game server 50 in operation S290. The game server 50 stores the game results in operation S300.

According to a music game of the present invention, UCC data combined with action note data is used. As described above, the action note data includes information about a predetermined action that should be performed by a game user at a predetermined time while the UCC data is being reproduced.

The predetermined action is performed by operating a predetermined part of an action inputting apparatus, usually called a game console.

Examples of such action inputting apparatus include a joystick, a controller, an extended joystick, a simplified keyboard, etc. When the game is played in a computer, the action inputting apparatus may be a keyboard. In the extended joystick, additional buttons for inputting information required in the game is further included with buttons of a general joystick. In the simplified keyboard, keys used in the game from a generally keyboard are gathered in one device.

For example, a music game reproduces UCC as BGM and requires a user to input keys on a keyboard according to the rhythm suitable to the music in the UCC. Whenever a note is played, arrows are displayed on a screen, and the user presses the arrows on the keyboard so as to score a point.

Here, the simplified keyboard may only include arrows and enter keys. The enter key may be used as a control key to select music or stop the game.

Figure 7:
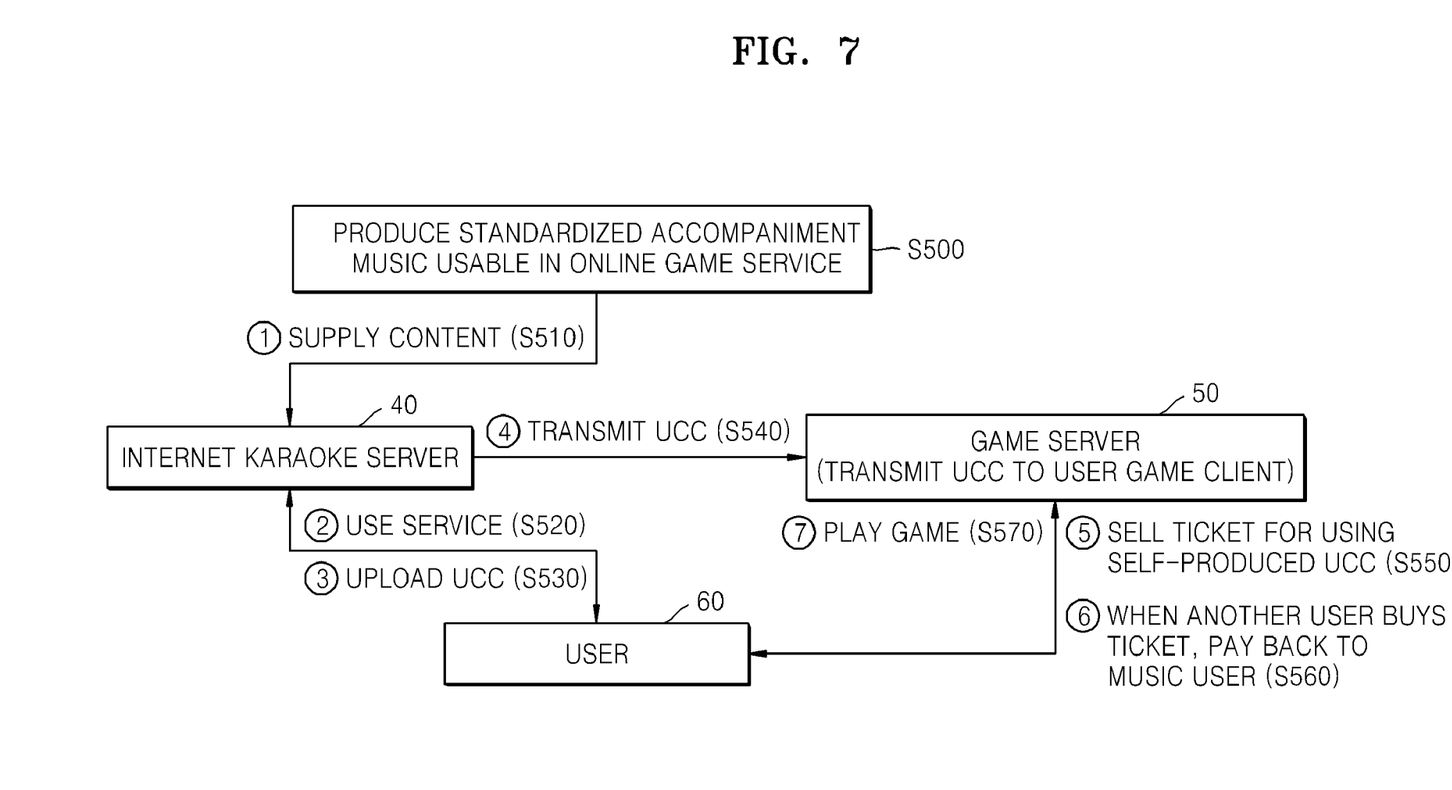
FIG. 7 is a flowchart illustrating a charging method according to an embodiment of the present invention.

The game server 50 may charge a fee to the game user 80 for using such game service. FIG. 7 is a flowchart illustrating a charging method according to an embodiment of the present invention.

First, standardized accompaniment music is produced in operation S500 that is usable in an online game service. An accompaniment music producer provides content of the produced accompaniment music to a karaoke server 40 in operation S510. A user 60 uses a music service in operation S520, and uploads produced UCC to the karaoke server 40 in operation S530. The karaoke server 40 transmits the UCC to a game server 50 in operation S540.

A music user can sell a ticket of a predetermined amount to the game server 50 related to using self-produced UCC in operation S550.

For example, when a game user uses the UCC of the music user, the game server 50 may charge a fee, and return the entire or a part of the fee to the music user as a payback in operation S560. Accordingly, the game server 50 may include a fee administrator (not shown), which charges a fee for note BGM data to the game user, and returns the entire or a part of the fee to the music user as a payback.

The music user may play the music game by using the self-produced UCC in operation S570.

According to the game service method and the game server of the present invention, note BGM data in which UCC data and action note data are combined is generated, and by using the note BGM data in a game, a user can not only play the game but also participate in manufacturing the game. Accordingly, as music data generated by the user is used, expensive royalty for original music data is not required to be paid, and thus expenses for using a sound source can be reduced. Also, when the sound source cannot be used in a conventional music game, some sound sources can be replaced in a UCC form so as to be serviced. As the user participates in manufacturing the sound source used in the game, user's royalty for the game increases, and additional fun besides playing the game is provided.

Moreover a fee for using the UCC is paid by a game user, and is returned to a music user who produced the UCC, and thus participation of users can increase.

The invention can also be embodied as computer (including all apparatus that can process information) readable codes on a computer readable recording medium. The computer readable recording medium is any data storage device that can store programs or data which can be thereafter read by a computer system. Examples of the computer readable recording medium include read-only memory (ROM), random-access memory (RAM), CD-ROMs, magnetic tapes, floppy disks, optical data storage devices, and so on.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A game service method, comprising:
    receiving user created contents (UCC) data comprising accompaniment music data and a recording of a song sung by a music user;
    generating note background music (BGM) data comprising action note data corresponding to the accompaniment music data and the UCC data; and
    providing a game user with an online music game using the generated note BGM data.

2. The game service method of claim 1, wherein the receiving of the UCC data comprises:
    providing the accompaniment music data to the music user;
    receiving the UCC data from the music user; and
    checking whether the UCC data can be used in the online music game.

3. The game service method of claim 1, wherein the receiving of the UCC data comprises receiving the UCC data from a karaoke apparatus which provides the accompaniment music data to the music user and receives the UCC data from the music user.

4. The game service method of claim 1, wherein the action note data comprises information about a predetermined action that should be performed by the game user at a predetermined time during a reproduction of the UCC data.

5. The game service method of claim 4, wherein the predetermined action that should be performed by the game user is performed by operating a predetermined part of an action input device for the game user to play the online music game.

6. The game service method of claim 5, wherein the action input device includes a keyboard, a joystick, a controller, an extended joystick, or a simplified keyboard.

7. The game service method of claim 4, wherein the providing the game user with the online music game using the note BGM data comprises:
    reproducing the UCC data included in the note BGM data; and
    checking whether the game user performs the predetermined action that should be performed at the predetermined time during the reproduction of the UCC data.

8. The game service method of claim 1, further comprising:
    charging a fee for using the note BGM data, on the game user; and
    returning the fee or a portion of the fee to the music user as a payback.

9. A game server for providing a game using user created contents (UCC), the game server comprising:
    a UCC receiver which receives UCC data comprising accompaniment music data and a recording of a song sung by a music user;

a note background music (BGM) generator which generates note BGM data comprising action note data corresponding to the accompaniment music data and the UCC data; and a game provider which provides a game user with a game using the generated note BGM data.

10. The game server of claim 9, further comprising:
an accompaniment music data provider which provides the accompaniment music data to the music user; and
a UCC validity checker which checks whether the UCC data can be used in the game,
wherein the UCC receiver receives the UCC data directly from the music user.

11. The game server of claim 9, wherein the UCC receiver receives the UCC data from a karaoke server which provides the accompaniment music data to the music user and receives the UCC data from the music user.

12. The game server of claim 9, wherein the action note data comprises information about a predetermined action that should be performed by the game user at predetermined time during a reproduction of the UCC data.

13. The game server of claim 12, wherein the predetermined action is performed by the game user operating a predetermined part of an action input device for playing the game.

14. The game server of claim 13, wherein the action input device includes a keyboard, a joystick, a controller, an extended joystick, or a simplified keyboard.

15. The game server of claim 12, wherein the game provider comprises:
a UCC reproducer which reproduces UCC data included in the note BGM data; and
a user action checker which checks whether the game user performs the predetermined action that should be performed at the predetermined time, during the reproduction of the UCC data.

16. The game server of claim 9, further comprising a fee administrator which charges a fee for using the note BGM data, on the game user, and returns the fee or a portion of the fee to the music user as a payback.

17. A non-transitory computer readable recording medium having recorded thereon a program for executing a game service method for providing an online music game using UCC, the method comprising:
receiving UCC data comprising accompaniment music data and a recording of a song sung by a music user;
generating note background music data comprising action note data corresponding to the accompaniment music data and the UCC data; and
providing a game user with an online music game using the generated note BGM data.

* * * * *